(No Model.) 6 Sheets—Sheet 1.

H. BAUER.
CIGARETTE MACHINE.

No. 473,108. Patented Apr. 19, 1892.

Fig. I.

WITNESSES:
Franklin Moore
Wm. D. Colt

INVENTOR
Henry Bauer
per L. J. Van Stavoren
ATTORNEY

(No Model.) 6 Sheets—Sheet 4.

H. BAUER.
CIGARETTE MACHINE.

No. 473,108. Patented Apr. 19, 1892.

WITNESSES:
Franklin Moore
Wm D. Coll

INVENTOR
Henry Bauer
per S. J. Van Stavoren
ATTORNEY

(No Model.)　　　　　　　　　　6 Sheets—Sheet 5.
H. BAUER.
CIGARETTE MACHINE.

No. 473,108.　　　　　　　Patented Apr. 19, 1892.

WITNESSES:　　　　　　　　　　INVENTOR
Franklin Moore　　　　　　　　Henry Bauer
Wm J. Cole　　　　　　　　per S. J. Van Stavoren
　　　　　　　　　　　　　　　ATTORNEY (No Model.) 6 Sheets—Sheet 6.
H. BAUER.
CIGARETTE MACHINE.

No. 473,108. Patented Apr. 19, 1892.

WITNESSES: Franklin Moore Wm D. Colt

INVENTOR Henry Bauer per S. J. Van Stavoren ATTORNEY

UNITED STATES PATENT OFFICE.

HENRY BAUER, OF PHILADELPHIA, PENNSYLVANIA, ASSIGNOR, BY MESNE ASSIGNMENTS, TO THE CLIMAX CIGARETTE AND CIGAR MACHINE COMPANY, OF PENNSYLVANIA.

CIGARETTE-MACHINE.

SPECIFICATION forming part of Letters Patent No. 473,108, dated April 19, 1892.

Application filed April 29, 1891. Renewed March 28, 1892. Serial No. 426,697. (No model.)

*To all whom it may concern:*

Be it known that I, HENRY BAUER, a citizen of the United States, residing at Philadelphia, in the county of Philadelphia and State of Pennsylvania, have invented certain new and useful Improvements in Cigarette-Machines; and I do hereby declare the following to be a full, clear, and exact description of the invention, such as will enable others skilled in the art to which it appertains to make and use the same.

My invention has for its object generally to produce a simple but durable and positive machine adapted for making cigarettes and particularly for mechanically making cigarettes having a tobacco wrapper and a filler of any kind desired, or an all-tobacco cigarette having the essential requirements, first, of an even filler from end to end to cause the filler to smoke or burn evenly; second, of a smooth wrapper, so that it will not have in it wrinkles or blisters; third, of a well-pasted lap, so that it cannot suck air or is air-tight; fourth, of a lap free of filler filaments for preventing the formation of air holes or channels and for preserving the desired proportion of tobacco in the wrapper relative to that in the filler, so that both will burn or smoke evenly; fifth, of a loosely-rolled filler for obtaining a free-smoking cigarette, and, sixth, of a corresponding length and clean-cut ends for appearance and salability. Without having these requirements the cigarette is faulty, and it is only by having them that a free-smoking cigarette in which the filler and wrapper burn or smoke evenly from end to end is produced. For the securement of these requirements each filler is measured and prepared, preferably, by hand, as it is well known by those skilled in the art to which my invention pertains that the filler loosely made up can be more evenly laid from end to end and with less detriment to its component filaments (a long or straight cut filler being referred to) by manual manipulation than can be done mechanically. As the fillers are manually measured and prepared they are inserted one at a time in a receiver or succession of moving receivers, each of which carries a filler and in turn deposits it on the rolling apron or belt, or more preferably into and on the bottom of its pocket or loop without a fall or drop of the filler from the receiver to the place of deposit, thus preserving its set condition or formation during the time it leaves the hand of the operator until it is deposited upon the apron, after which time the latter and the wrapper maintain its set or evenness until the cigarette is formed. The moist and limber wrappers are manually worked one at a time—that is, the attendant smoothes out the folds or wrinkles as much as possible before placing the wrapper upon a carrier-plate, and in doing so applies hand-pressure in desired directions to affix it to the plate to remove any wrinkles or folds not previously effaced to insure a smooth wrapper, or one without blisters and wrinkles.

In affixing the wrapper to the plate or carrier the former is preferably so located thereon that that part of it to which adhesive material is not to be applied overhangs one edge of the plate, the extent of such overhanging being approximately equal to one roll or fold of the wrapper around the filler. The supporting-plate upon which the wrapper is so placed carries it to the apron or belt into a suitable presenting position for the filler. I prefer a presenting position which locates the overhanging portion of the wrapper as depending into the apron pocket or loop with the carrier located above the apron to the rear of the mouth of the apron pocket or loop, so that the carrier-plate preferably serves also as a support for the wrapper when adhesive material is applied thereto in its presenting position. The extent of width of wrapper on the carrier-plate is approximately equal to one roll or fold of the wrapper around the filler, as in practice, owing to the veins running through the wrapper, its moist or wet condition in which it has to be rolled, its natural porosity or pit-like formation or condition, and the expansive force of the filler, to which it is subjected after the cigarette is rolled and is still wet, prevents the edges of the wrapper or its lap securely uniting unless, comparatively stated, a wide band or layer of adhesive material in sufficient thickness to cover the veins or any permanent ridges on as well as the flat surface of the wrapper is applied to part of the wrapper on the carrier-plate and evenly distributed throughout the entire surface of said part pasted, in contradistinction to a line or edge film of such material as is used on paper wrappers.

The adhesive matter is applied by a device having, preferably, a flexible filamentary surface like plush or analogous material, so as to take up, retain, and carry to the wrapper the required supply for the thick band or layer of paste, and has imparted to it a wiping motion as it applies the paste for evenly distributing it as it is deposited on the wrapper, and to prevent suction between the paste and paster as it leaves the wrapper, which suction would tend to draw the paste into filaments and produce unevenness of distribution of the same.

As the wrappers are thick and rough, owing to the veins or ridges running through them, and as different wrappers vary in thickness and each has a thick band of paste applied to it, the mouth of the apron pocket or loop would have to be opened wider than is customary for thin wrappers were the tobacco wrappers presented to the filler in a manner corresponding to that for paper wrappers, in order to prevent such paste contacting with and adhering to the bight of the apron. If such presentation is made, the mouth of the pocket or loop is wide enough to allow particles or filaments to escape from the filler and roll or slip in advance of it as it is rolled up on the wrapper, and such particles meeting the paste or adhesive matter on the wrapper are by it retained in position between the lap of the wrapper, and these particles so located prevent proper union of the edges of the wrapper and either cause it to suck air or increase the amount of tobacco in the wrapper at their locations and disturb the relative proportions of the filler and wrapper, so that the cigarette burns or smokes unevenly or crooked. I avoid the escape of the filler particles or filaments to between the wrapper edges or lap and consequent bad results and the contacting of the paste on the wrapper with the bight of the apron by first presenting or feeding a part of the wrapper into the apron-pocket in addition to the filler placed therein, such wrapper being of an extent preferably sufficient to inclose the filler in one fold of the wrapper when rolled or drawn around the filler, then closing the mouth of the apron pocket or loop by a suitable closing device, which in the act of closing the pocket is suitably controlled so as not to impose undue closing pressure upon the closed sides of the pocket-mouth and to impinge or bind the line of wrapper in the pocket-mouth to hold the wrapper in position while the filler is then preferably being drawn to a proper size in the pocket. In doing this the part of the wrapper in the pocket is rolled around the filler to make a fold of wrapper around the filler and to form the initial lap of the wrapper, thereby inclosing the filler to prevent escape of its filaments or particles to between said lap in continuing the subsequent rolling of the wrapper for uniting its edges or lap. While this described rolling or drawing the filler to a size and inclosing it in the first fold of the wrapper is being accomplished, a wrapping roller or device, preferably, is advancing to and comes into position adjacent to the closed pocket-mouth at the termination of making the first fold of wrapper around the filler, as described. The pocket-closing device then begins its return movement, and in doing so tends to open the mouth of the contracted pocket, but the wrapping-roller being in position adjacent to such mouth takes up the slack of the apron, or of its pocket caused by such opening movement, and only permits the mouth of the pocket to open wide enough for the pasted part of the wrapper to pass into the bight of the apron without the paste on the wrapper contacting with the apron-bight. Thus the apron-bight is prevented from rubbing the paste off of the wrapper and fouling the apron when the wrapper is rolled by the wrapping-roller to unite its edges in the bight of the apron. The preferable drawing of the filler to a proper size and the rolling it upon the wrapper while in the pocket to make the first roll of wrapper around the filler I accomplish by preferably drawing or pulling on the front or right-hand end (looking at Fig. 1) of the apron. The wrapper-roller is then advanced toward the rear end of the machine into position to take up the slack of the opening movement of the closed pocket when the pocket-closing device recedes, thereby preserving the bight of the apron in condition to admit of the passage of the pasted part of the wrapper through it without the paste on the wrapper contacting with and being rubbed off of the wrapper by the apron-bight and also preventing the expansion or slipping of the inclosed filler in the pocket during the partial opening of its mouth by maintaining the pocket at its contracted size.

The rolling of the wrapper to unite its edges is done preferably upon a table or other suitable rolling-surface, and during this operation the slack in the apron in front of the advancing bight is taken up by drawing on the rear end of the apron to prevent the wrapper and filler slipping in the bight of the apron which would produce wrinkles or folds in the wrapper or damage the cigarette. I provide for the degree of initial looseness or size of pocket required for the filler by regulating the extent of slack taken up in the apron-pocket in drawing the filler to its proper size. This size is governed by the degree of free smoking or burning desired after the filler has compensated for the shrinkage of the wrapper in drying, and, further, by varying the depth of the apron-pocket by adjusting the extent of movement of its pocket-forming mechanism and that of the devices for taking up the slack of the apron-pocket different sizes of cigarettes in cross-section may be made on the machine, as desired. The wrapper has, therefore, a double fold, or its edges are lapped, as in hand-made cigarettes, which is necessary for proper securement and also to provide the proper proportions of tobacco in the wrapper and filler to cause them to burn evenly, and by placing one edge or fold portion of the wrapper on its carrier to be pasted and by permitting the other edge or fold portion to hang down into the the apron-pocket, as described, the mouth of the latter can be closed, the wrapper rolled one fold around the filler as it is drawn to its proper size, and the initial part of the lap formed to inclose the filler in the wrapper to prevent the escape of filaments or particles therefrom between its edges when the pocket is drawn by the wrapping-roller into a bight on the surface of the table where the cigarette is rolled.

The finished cigarettes in a wet condition are trimmed to corresponding size and their ends are clean-cut, each cigarette being held by a graduated presser, which comes into position and bears upon the wet cigarette before its ends are trimmed. My invention therefore comprises a feeding device or receiver for the fillers, which are preferably inserted into the receiver manually or by hand, which receiver deposits the fillers on or into a pocket or loop in the apron without a fall or drop of the fillers; mechanism which closes the mouth of the apron-pocket; devices for drawing the filler to its proper size and inclosing it in a fold of the wrapper while in the pocket and before the pocket has been drawn out of the recess or opening in the table and which prevents escape of any of the filaments or particles between the edges of the wrapper where they are to lap; a paster carrying the requisite supply of adhesive material and having a wiping action or movement in applying the paste to evenly distribute it; a wrapper-carrier which admits of overhanging the wrapper on it and which serves as a support for the wrapper while being pasted, and a presser-bar for holding each cigarette while being trimmed, the relative positions, constructions, and operations of the same, as well as the actuating devices for which, may be varied as desired. In the drawings I have shown a type of machine which I deem a preferable one for the purposes of my invention.

The invention consists in the combinations, constructions, and arrangements of parts, as hereinafter more particularly described in the specification and pointed out in the claims.

Reference is had to the accompanying drawings, wherein—

A represents the housing or frame of a preferable form of machine embodying my invention, of which $a$ is the front and $a'$ the rear end of the same.

At the front end $a$ and partly extending over the top of the machine is an annular or other suitably-configured guide or way $a^2$, secured to or forming part of the bracket $a^3$, fastened to the front end of the machine.

Figures 2, 3, 4:
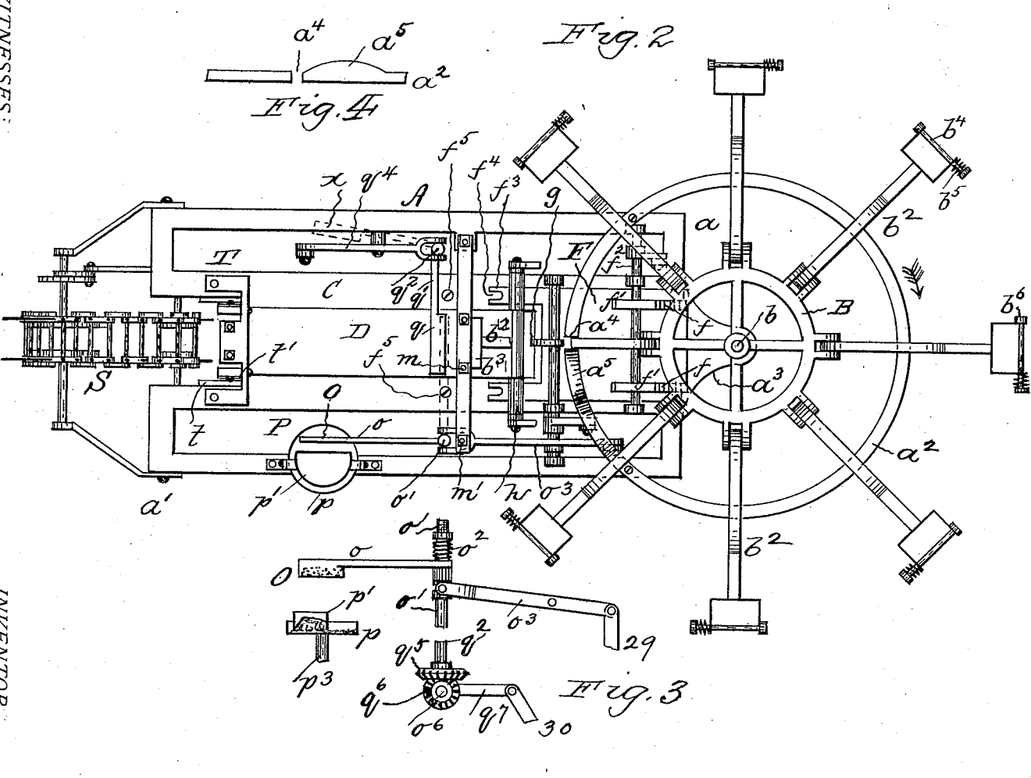
Fig. 2 is a plan of the machine with main driving-shafts and link connections for the operative parts removed.
Fig. 3 is a sectional elevation, partly broken away, the upper part showing the paster and rocker-shaft with reacting spring and shifting-lever for vertically moving it on its rock-shaft, and also the paste-cup, without actuating mechanism therefor, and the lower part showing the rock-shaft and part of the controlling mechanism for the wrapper-carrying plate.
Fig. 4 is an elevation of part of the way or guide for the rotating receivers for the fillers, showing more plainly the cam or raised portion of such guide or way for elevating the receivers over interfering mechanism as they approach the apron-pocket.

In the rear end or side of way $a^2$ and coincident with the longitudinal center line of the machine is a slot $a^4$, and to one side of said slot on the top of the way or guide is a raised cam $a^5$, (see more plainly Fig. 4,) for a purpose to be described. In bracket $a^3$ is mounted a vertical shaft $b$, having at its upper end a carrier-wheel B and at its lower end a bevel-gear $b'$. Suitably pivoted to wheel B are a number of radial arms $b^2$ of any suitable configuration extending beyond and resting and rotating upon the way or guide $a^2$. The arms $b^2$ at their outer ends are each provided with preferably a triangularly-configured box or receiver $b^3$, with the apex forming the bottom of the same, for the reception of the fillers. Each receiver $b^3$ has an open top and an outer hinged side $b^4$, provided with retracting-springs $b^5$ to normally maintain the side $b^4$ closed. Each hinged side $b^4$ is provided with a suitably-located finger $b^6$, which, when actuated as hereinafter set forth, opens the side $b^4$ to permit the filler moving out of a receiver, and such opening of said side only takes place when a receiver is in its position to deposit the filler, or, as in the present case, in the apron-pocket. (See Fig. 5.)

At the top of the machine is a fixed table C, having a transverse opening $c$ near its front or right-hand end, which opening has depending sides and ends, within which the loop or pocket $d$ in the apron is formed, the apron or belt D resting upon the table. In advance of table-opening $c$ and moving in suitable guides or ways is a sliding apron pocket or loop closing device or plate F, having rack connection $f$ with segmental gears $f'$ on a cross-shaft $f^2$, which is shown located above the top of the machine near its front or right-hand end. This plate F has rearwardly-projecting side arms $f^3$, with bifurcated or recessed ends $f^4$, (see Fig. 2,) which arms are located beyond the ends of the opening $c$ and rest upon the table C. As the plate F slides to and closes the apron pocket or loop $d$, the recessed ends $f^4$ of its arms $f^3$ pass under the heads of pins, bolts, or other suitable devices $f^5$ (shown in Figs. 2 and 5) to limit the extent of such movement, and also to prevent the rear end of said plate raising from the table when the front end of the apron or belt is actuated to take up the slack in the apron pocket or loop during the movement which draws the filler to a proper size and rolls it into the wrapper and forms the first fold of the wrapper around the filler.

Figure 1:
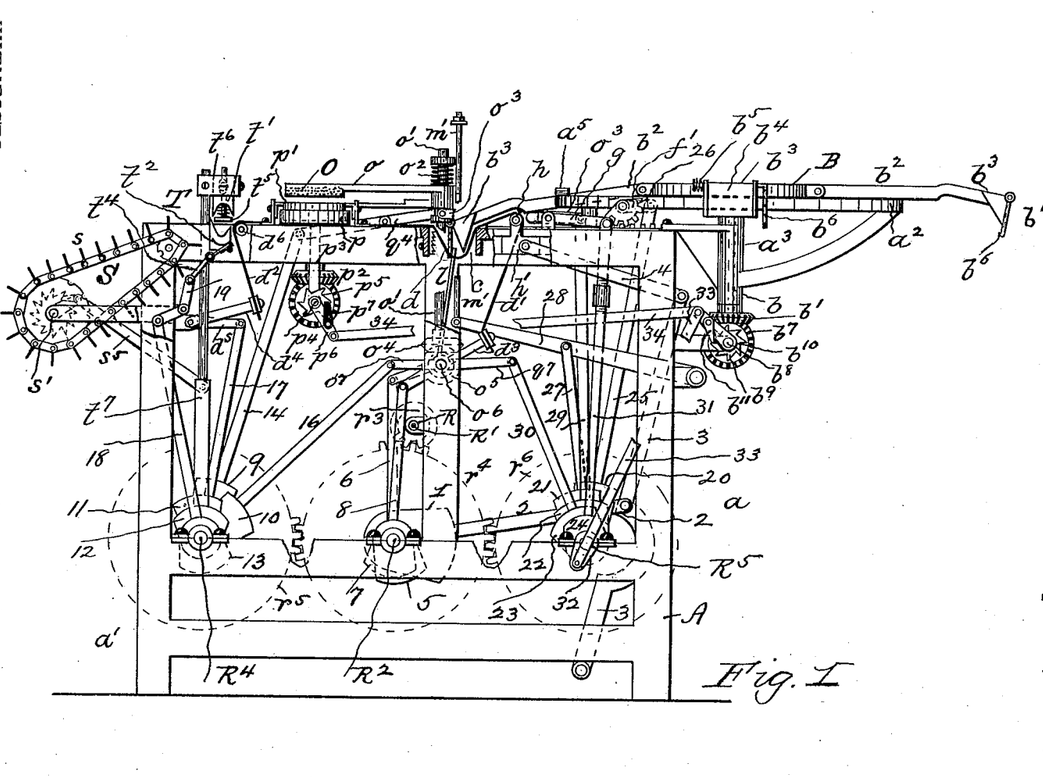
Figure 1 is a side elevation, partly broken away and partly in section, of a preferable form of machine embodying my improvements for making all-tobacco cigarettes, the controlling-cams on the main shafts for the actuating parts being diagrammatically illustrated one larger than the other for clearness, as said cams are of the usual form, having dwells and acting-surfaces suitably arranged to time the working parts of the machine.
Figure 5:
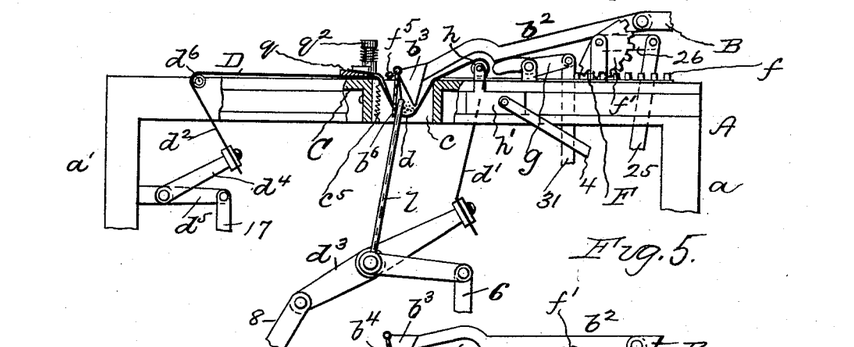
Fig. 5 is a partial sectional elevation showing first position of the actuating or working parts in the type of machine illustrated, indicating the wrapper in position with part of it depending into the apron pocket or loop, the open mouth for the latter, the receiver in the pocket or loop, and the striker-arm after having opened a receiver to deposit the filler into the apron pocket or loop.
Figure 6:
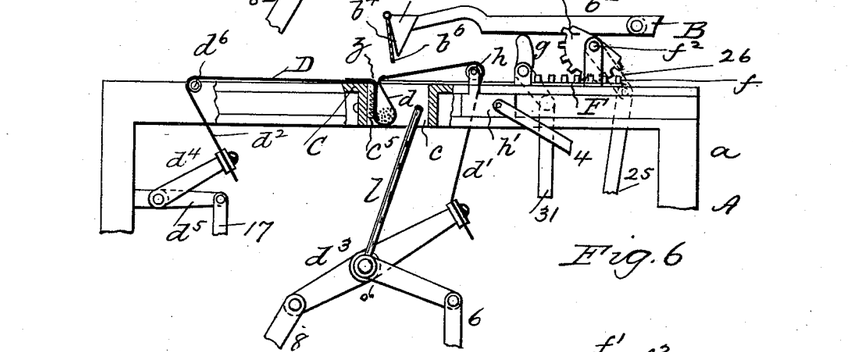
Fig. 6 is a like view showing the receiver out of the pocket or loop and the top of the latter closed.
Figure 10:
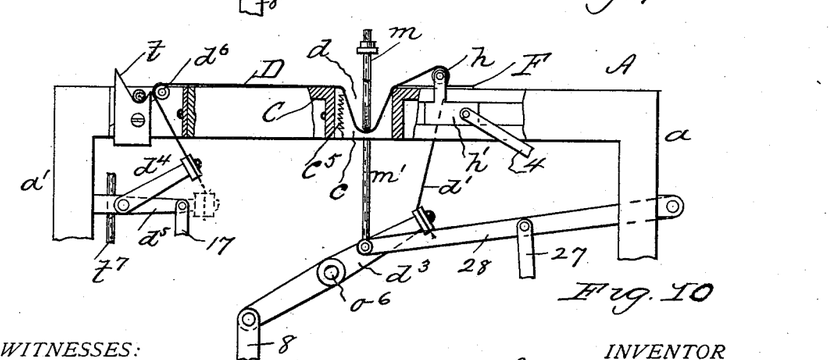
Fig. 10 is a like view showing the plunger depressed and forming the apron pocket or loop for a succeeding receiver.
Figures 11, 13, 15, 16:
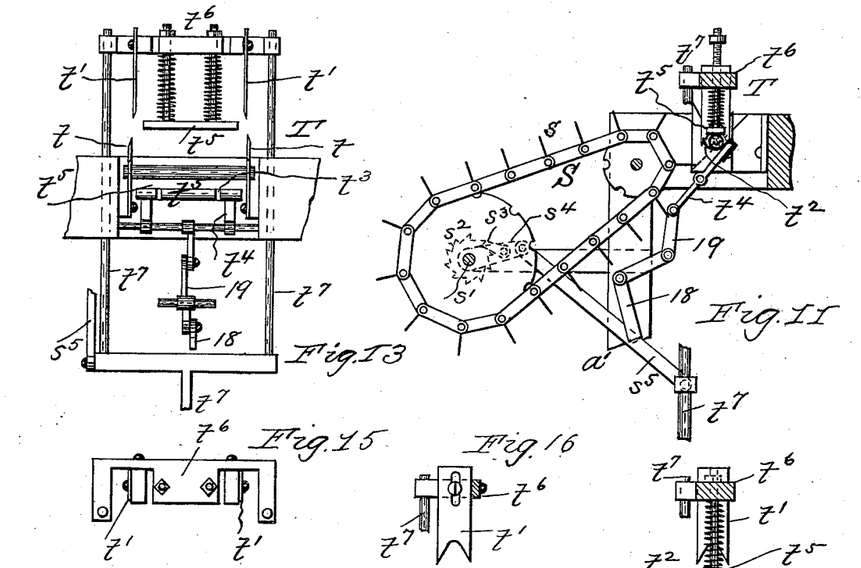
Fig. 11 is a sectional view showing the cutters and delivery end of the machine, the cutters being in their positions after trimming the ends of a cigarette.
Fig. 13 is a front elevation of the cutters.
Figs. 15 and 16 are respectively a top view and a sectional side elevation of the movable cutters.
Figures 12, 14:
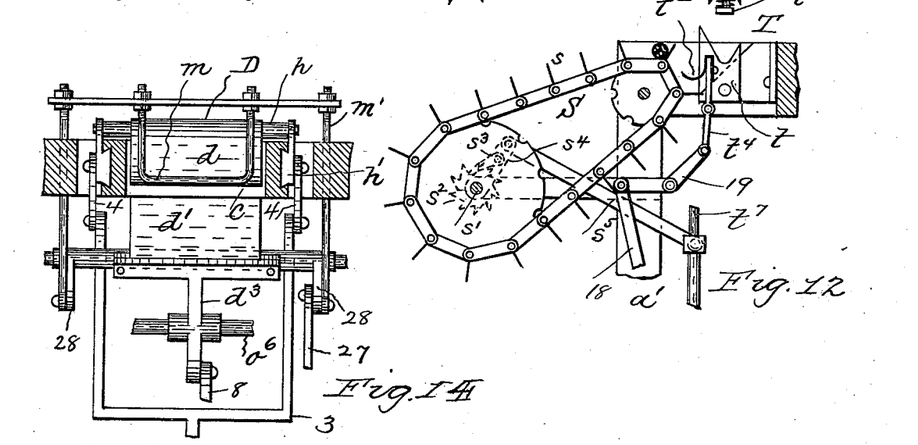
Fig. 12 is a like view showing the movable part of the cutters in elevated position and the cigarette deposited in the delivery appliance.
Fig. 14 is a sectional elevation across the machine through the apron-pocket, showing the plunger forming the pocket, and in its lowered position corresponding to that shown in Fig. 10.

In line with slot $a^4$ in way $a^2$ is a pivoted lever $g$, the pintle for which is mounted in brackets on the top of the machine. Said lever $g$ controls the descent and ascent of each receiver-arm $b^2$ through the way or guide-slot $a^4$ to bring a receiver into the apron pocket or loop and return it therefrom. To the rear of lever $g$ is the wrapping-roller $h$, mounted in slides $h'$ in suitable ways or guides $h^2$ in the machine, and over which roller the front end $d'$ of the apron passes when in its normal position, as shown in Figs. 1, 5, and 6. To the rear of roller $h$ and in line with the table-opening $c$ is a plunger $m$, preferably made of wire, as shown more plainly in Figs. 10 and 14, and having its supporting-bars $m'$ suitably mounted in the machine. Said plunger is vertically adjustable on said bars $m'$ to regulate the depth of the apron pocket or loop, as desired.

O represents the paster consisting of, preferably, a pad of plush, felt, or other suitable or analogous yielding or flexible material suitably secured to an arm $o$, splined to a vertical shaft $o'$ and having a reacting spring $o^2$, so that said arm will rock or oscillate horizontally with said vertical shaft $o'$, and also be free to have an up-and-down movement on said shaft, as hereinafter set forth.

To one side of the machine and in line with the paster O when in its normal position (see Figs. 2 and 3) is the paste-cup P, consisting of a lower rotating open-top holder $p$ and a smaller fixed hopper $p'$, suitably supported as desired and preferably located eccentric to or to one side of holder $p$. The lower edge of said fixed hopper approaches but does not contact with the bottom of the rotating holder $p$, in order that a required amount of paste shall be fed to holder $p$ for the paster O to take up, and hence it conveys to the wrapper the amount of paste necessary to bind or secure its edges together when rolled. The fixed hopper $p'$ is adjustable vertically within the rotating holder $p$ to regulate the supply or flow from the former to the latter, as desired. The sleeve end of paster-arm $o$ on shaft $o'$ is provided with a shifting-lever $o^3$, (see Figs. 2 and 3,) suitably pivoted as desired for raising said arm and its paster vertically. The shaft $o'$ (see more plainly Fig. 1) is provided with a bevel-gear $o^4$, engaging with a like gear $o^5$ on a transverse shaft $o^6$, and the latter is operated as hereinafter more fully set forth.

On the side of the machine opposite to that of the paster is located the wrapper-carrier plate $q$, (see Fig. 2,) secured to an arm $q'$, splined to a vertical shaft $q^2$, so as to have an up-and-down motion on said shaft $q^2$ and also to rotate therewith. Said wrapper-plate $q$ has a reacting spring similar to that for paster-arm $o$ (see Fig. 5) and a shifter-bar $q^4$ (see Figs. 1 and 2) for vertically moving it on its shaft $q^2$. The latter has a bevel-wheel connection $q^5$ with a like wheel $q^6$ on shaft $o^6$, (see Fig. 3,) the same as the corresponding parts for the paster-arm $o$. Said bevel-gears $q^5$ and $o^5$ on shaft $o^6$, however, are loose on said shaft $o^6$ and move independently of each other, as they each have reversely-located arms $q^7$ and $o^7$, respectively, (see Figs. 1 and 3,) controlled by mechanism hereinafter explained, to rock successively the paster and wrapper-carrier across the table to the rear of its opening $c$, as indicated by the full and dotted lines of said parts in Fig. 2. The front end $d'$ of apron D, after passing over wrapping-roller $h$, is secured to one end of a lever $d^3$, loosely supported on shaft $o^6$, and the rear end $d^2$ of the apron, after passing over a fixed roller $d^6$, located adjacent to and flush with the rear end of table C, is secured to a pivoted lever $d^4$, having a crank or other like fixture $d^5$. The opposite ends $d'$ $d^2$ of the apron are connected to the said respective levers for the purpose of first contracting the pocket and then taking up the slack in the apron in advance of the bight at different times from each of its ends to accomplish the results before described.

Adjacent to the rear end of table C or roller $d^6$ is located the cutters T for trimming each cigarette at both ends to make the same even and the cigarettes of a corresponding length. As more plainly shown in Figs. 11 to 16, inclusive, said cutters consist of preferably lower fixed cutters $t$ and upper movable cutters $t'$, having recessed or approximately V or U shaped cutting-edges, through which the ends of the cigarette project previous to being trimmed.

Between the fixed knives $t$ and flush with the lower part of their recesses is a holder or receptacle $t^2$ for the cigarette while being trimmed or cut, and after such operation. This receptacle may be a fixed one with transverse slots for the passage of the arms $s$ in a conveyer-belt S, so that said arms $s$ in passing through said slots will take up and convey such trimmed cigarette from the receptacle $t^2$ to the place of delivery from the machine, which may be located as desired. Said receptacle with slots $t^3$ (see Fig. 13) may, however, be supported upon pivoted levers $t^4$ and by them moved into and out of the path of the arms $s$ of belt S, as shown more plainly in Figs. 11 and 12.

To clamp or apply pressure to the cigarette during cutting, and thereby prevent breaking or tearing of the wrapper, a cushion or spring-plate or presser-bar $t^5$ is interposed between the movable cutters $t'$, which plate is preferably in advance of cutters $t'$, so that it will meet and apply pressure to the cigarette before the knives $t$ $t'$ begin to act. The last-named knives $t'$ are adjustable on the top bar $t^6$ of their supporting-frame $t^7$, suitably mounted on the machine, and the clamping-plate $t^5$ is correspondingly adjustable for varying its pressure upon the cigarettes, as desired.

The conveyer-belt S may be of any suitable construction and arrangement, one of its shafts $s'$ being shown provided with a ratchet-wheel $s^2$ for engagement with a pawl $s^3$ on an arm $s^4$ on said shaft. Arm $s^4$ has a link connection $s^5$ with the cutter-frame $t^7$, so that as the latter moves up and down the arm $s^4$ is moved to bring pawl $s^3$ and ratchet $s^2$ into action to intermittently rotate the conveyer-belt S.

The paste-holder $p$ is secured to a shaft $p^3$, (see Fig. 4,) suitably mounted in the machine and has at its lower end a bevel-wheel connection $p^2$ (see Fig. 1) with a shaft $p^4$, having a ratchet-wheel $p^5$ and an arm $p^6$ with pawl $p^7$, whereby said holder is intermittently rotated.

The bevel-wheel $b'$ on the carrier-wheel shaft for the receivers $b^3$ meshes with a like wheel $b^7$ on shaft $b^8$, provided with ratchet-wheel $b^9$ and arm $b^{10}$, with pawl $b^{11}$ for correspondingly rotating the wheel B and the receivers $b^3$ to bring the latter in succession to the apron-pocket $d$, and as such receivers approach the pocket their arms $b^2$ are elevated by the cam $a^5$ on way $a^2$ to raise the same out of the way of any interfering working parts; but such cam $a^5$ is not essential when the guide or way is elevated a sufficient distance above the top of the machine to admit of the receivers $b^3$ clearing such working parts. In the last-named construction the extent of descent or fall of the receiver-arms $b^2$ through the guide-slot $a^4$ to place the receivers in the apron-pocket is increased and the lever $g$ and its actuating mechanism, to be described, must be correspondingly changed. With the use of the cam $a^5$ such fall is materially reduced and the machine is more compact.

Figure 7:
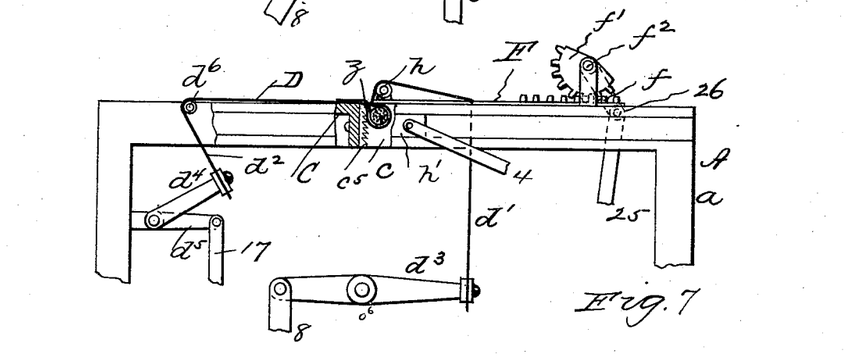
Fig. 7 is a similar view, the receiver and striker-arms having been removed, showing the filler drawn to its proper size and drawn upward onto and around the wrapper, the first fold of the wrapper being around the filler and the initial formation of the lap of the wrapper having thus been made and the forward end of the apron having been drawn down upon.

R represents the main driving-shaft, which, as shown, is tubular and through which passes a rod or shaft R'. Upon the latter at one end is secured a driving-wheel $r$, having one member of a clutch $r'$, the other part of the clutch $r^2$ being secured to the tubular shaft R. (See Fig. 7.) By sliding the rod or shaft R' longitudinally in opposite directions said shaft R' is coupled with and uncoupled from the shaft R to respectively rotate it or stop such rotation. The shaft R has a gear connection $r^3$ with shaft $R^2$, which in turn has corresponding connections $r^4$, $r^5$, and $r^6$ with shafts $R^3$ and $R^4$, (see Fig. 1,) all of which are suitably mounted on the machine.

Figure 17:
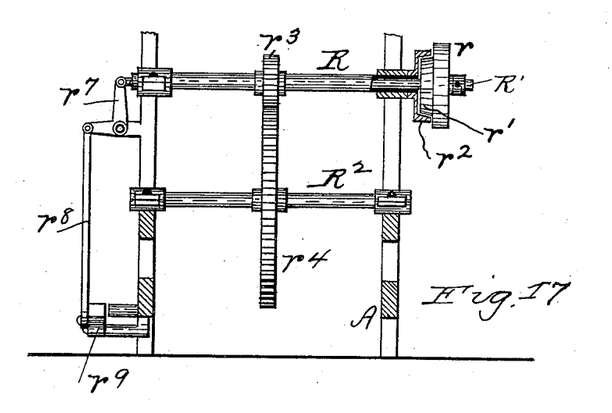
Fig. 17 is a transverse section of driving-shaft and part of the machine, the same being partly in elevation, also showing the clutch therefor.
Figure 18:
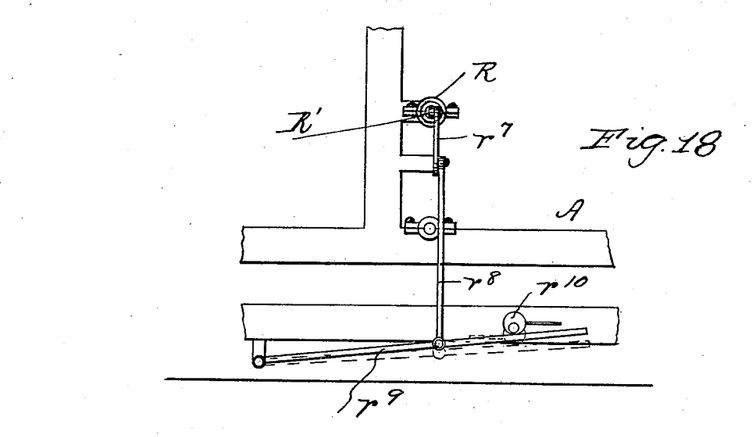
Fig. 18 is a side elevation of part of the same, showing the treadle mechanism and locking device for said clutch.

Any suitable actuating mechanism may be employed for controlling the clutching movements of shaft R'. In the drawings, Figs. 17 and 18, it is shown having a bell-crank $r^7$ and a link connection $r^8$ with a treadle $r^9$, which, when the machine is running, may be locked in position by an eccentric or other fastening device $r^{10}$.

Upon the shaft $o^6$ (see Figs. 1, 5, and 6) is loosely mounted a striker-bar $l$ for impinging against the receiver-lid finger $b^6$ to open the same when moved into the apron-pocket $d$. (See more plainly Fig. 5.)

Upon the shafts $R^2$, $R^3$, and $R^4$ are located the various cams or cranks, with link or lever connections for actuating all of the foregoing-described operative parts, and while in the drawings I have shown different cams or cranks on the different shafts and as will be described I here premise that I do not limit myself thereto, as their arrangement or selection is not arbitrary and may be varied as desired.

Upon shaft $R^2$ (see Fig. 1) is located the cam 1, having link connection 2 with a pivoted lever 3, which in turn has link connections 4 with the slides or carriage $h'$ for the wrapping-roller $h$, whereby it obtains its to-and-fro motion over the table C. Upon said shaft $R^2$ is also a cam 5, having a link connection 6 with the striker-bar $l$ for actuating it. There is also on said shaft a third cam 7, having a link connection 8 with lever $d^3$ to which the front end $d'$ of the apron D is attached to move the same to take up the slack of the apron-pocket and admit of or form said slack in the apron.

Upon shaft $R^4$ are shown cams 9, 10, 11, 12, and 13. Cam 9 has a link connection 14 with the shifting-bar $q^4$ for the wrapper-plate $q$ to elevate and lower the same. Cam 10 has a link connection 16 with the crank $o^7$ for the bevel-gear $o^5$ on shaft $o^6$ to rock or oscillate shaft $o^2$ and the paster O. Cam 11 has a link connection 17 with crank-arm $d^5$ of lever $d^4$ for moving it to take up the slack in and slacken up the rear end of apron D, as required. Cam 12 engages with the cutter-frame $t^6$ to actuate the same and through the medium of the link connection $s^5$ to operate the conveyer-belt S, and cam 13 has a link 18 and bell-crank 19 in connection with the movable cigarette-receiver to actuate the same.

Upon shaft $R^5$ are shown cams 20, 21, 22, 23, and 24. Cam 20 has a link connection 25 with crank 26 on shaft $f^2$ to oscillate the same and sectors $f'$ for sliding the pocket-closing plate F. Cam 21 has a link connection 27 with pivoted lever 28, which in turn is in engagement with the pocket-forming plunger-frame $m'$ to move the plunger up and down. Cam 22 has a link connection 29 with the shifter-bar $o^3$ for the paster-arm $o$ to move it vertically. Cam 23 has a link connection 30 with the crank connection $q^7$ of bevel-wheel $q^5$ on shaft $o^6$ to rotate or rock shaft $q^2$ to correspondingly move the wrapper-carrying plate $q$, and cam 24 has adjustable sectional link connection 31 with lever $g$ for lowering and raising the receivers $b^3$ into and out of the apron-pocket $d$. One end of shaft $R^5$ is provided with a crank 32, having a link connection 33 with the arm $b^{10}$ of shaft $b^8$, which arm $b^{10}$ in turn has a link connection 34 with the corresponding arm $p^6$ on shaft $p^4$, said arms being oppositely directed, so that the pawls thereon will engage with their respective ratchet-wheels alternately on the reverse movement of the link 33 to successively rock shafts $b$ and $p^3$ to respectively and correspondingly actuate the wheel B and its receivers $b^3$ and the shaft $p^3$ for the paste-holder $p$.

The operation is as follows: The receivers $b^3$ are successively filled or charged by an attendant, preferably, or in any other desired manner. A wrapper is preferably manually placed upon the plate $q$ when in its normal position at the side of the machine.

Figure 8:
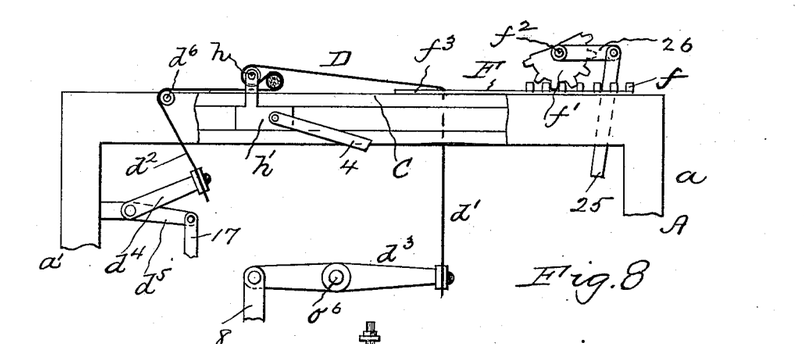
Fig. 8 is a view in elevation, partly broken away, showing the wrapping-roller rolling the wrapper round the filler in the bight of the apron upon the table.
Figure 9:
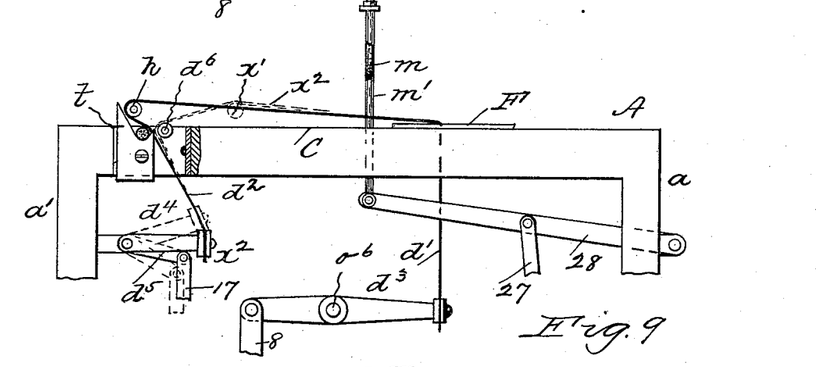
Fig. 9 is a partial sectional elevation showing in full lines the cigarette deposited on the stationary cutters and in dotted lines the wrapping roller or device on its return movement and the slack of the rear or left-hand end of the apron taken up to withdraw the apron from the cutters, said view also illustrating the plunger mechanism for forming the apron pocket or loop, it being in its elevated position.

The machines being started, the receiver $b^3$, approaching the guide-slot $a^4$, is raised by the cam $a^5$ out of the way of interfering actuating parts and then lowered to said slot, into which the arm $b^2$ of such receiver drops until it impinges against lever $g$, at which time the receiver $b^3$ is in position over but not in the apron-pocket. The other parts of the machine are then in the following positions: The wrapper-carrier $q$ is in its raised position at one side of the machine, as indicated by dotted lines $x$, Fig. 2, the wrapper having been laid thereon with a portion of the same hanging down or overhanging the front edge of the carrier or plate $q$. The pasting device O has meanwhile descended into the paste-holder $p$ to take up a supply of paste and ascended to near its elevated position, as shown in Fig. 1. The cutters $t'$ are then ascending. The cigarette-receiver $t^2$ is in position to deliver a cigarette to the belt S. Pocket-closing plate F and wrapper-roller $h$ are in their normal positions, and, meanwhile, the plunger $m$, having descended to form the apron loop or pocket $d$, has returned to its elevated position to be out of the way of the receiver ready to enter the loop or pocket. The lever $g$ now rocks to lower its rear end and cause the receiver $b^3$ to enter the loop or pocket and descend to near its bottom, at which time the striker-arm $l$ is actuated to move the trigger $b^6$ and open the side $b^4$ of the receiver to empty the filler therein into the loop or pocket, as illustrated in Fig. 6. As the filler when deposited into the pocket has no fall, owing to the bottom of the pocket being close to the V-shaped bottom of the receiver, the filler is deposited evenly in the pocket from end to end and there is no escape of the filler from the ends of the pocket, and an economy in amount of filler used in the machine is secured. Meanwhile the wrapper-carrier V in its elevated position is moving toward the loop or pocket, as is also the paster O, they being located in different planes, and the carrier V moving toward said pocket in advance of the paster until it reaches the pocket. The lever $g$ is then reversely tilted to raise the receiver $b^3$ out of pocket $d$, and it rotates or in other manner moves away to the filling station or attendant. In raising out of the pocket the side $b^4$ of the receiver is closed by its spring $b^5$. Meanwhile the wrapper-plate $q$ descends, and in so doing the overhanging edge of the wrapper on said plate passes into the apron pocket or loop adjacent to its rear side to overlap said side and locate itself in front of the filler. Meanwhile the paster O is advancing to the pocket or loop above the wrapper-plate $q$, and the plate F has started toward the loop or pocket $d$ and closes the mouth of the same, as shown in Fig. 6, binding or impinging that part of the wrapper in the closed pocket-mouth, while the lower part of the wrapper in the pocket is free, as at $z$. As soon as the plate F begins to close the pocket $d$, the lever $d^3$ is tilted to draw down or pull the front end $d'$ of the apron to take up the slack in the pocket or loop $d$, to contract the same and draw the filler to its proper size, and make the first fold of the wrapper around the filler, and it reversely moves when the apron requires slack or before the filler has been fed to the apron, as hereinafter set forth. When the plate F has fully closed the apron pocket or loop, too much pressure of said plate against the sides of the pocket or loop is avoided by the recessed ends $f^3$ of the plate engaging with the stops $f^5$, whereby the lever $d^3$, in continuing to take up the slack of the front end of the apron, does so without undue strain. Meanwhile the paster has come into position over the wrapper-carrier and is descending to initially apply paste to that part of the wrapper on the carrier. The pasting of the wrapper while on the carrier avoids getting paste on the apron, and the wrapper has a support which admits of it resisting the pressure of the paster thereon, so as to avoid damaging the moist and limber or tender wrapper, and it is also held by the closure of the mouth of the apron pocket to admit of the paster moving over it with a wiping motion. Meanwhile, the wrapping-roller $h$ moves toward the apron pocket or loop, and as it reaches the same said pocket or loop is of the form and in position as shown in Fig. 8, at which time the paster has started to return, and in making its initial movement of return it first oscillates to wipe the paste onto the filler to complete such pasting, and, continuing its oscillation, it ascends at the same time. The wrapper-carrier has already started on its ascent, and in doing so withdraws itself from the wrapper. As soon as the paster and wrapper-carrier return to the sides of the machine the paster descends into and ascends from the paste-holder $p$ with a fresh supply of paste and the wrapper-carrier is supplied with another wrapper. As the apron-pocket $d$ is closed and brought to the position shown in Fig. 7, it will be noticed that the filler is moved onto that part of the wrapper in said pocket, instead of away from it, and that the filler is brought to its proper size before the wrapper is rolled, in contradistinction to being brought to its proper size on the rolling of the wrapper, and the first roll or fold of the wrapper around the filler to make the initial part of the lap to inclose the filler and prevent escape of its particles or filaments where the lap is to be made. This described action of bringing the filler to a size and inclosing it in one fold of the wrapper before rolling the lap of the wrapper is advantageous in making all-tobacco cigarettes or cigarettes having a tobacco wrapper, in that as wrappers which are known as "wrappers of a tender nature" can be used, as they are not subject to the pulling or compression strains of the apron in drawing the wrapper to its proper size. As soon as the filler is drawn to its proper size and inclosed in the first fold of the wrapper by the contraction of the apron-pocket to the position shown in Fig. 7 the plate F starts to return to admit of the wrapper-roller $h$ moving the pocket or loop onto the table C for rolling the wrapper to unite its edges in the bight of the apron. The initial return movement of the plate F tends to open the mouth of the apron-pocket or produce slack in such pocket; but this slack is taken up by the roller $h$ to maintain the duly-contracted size of the apron-pocket, the bight thereof, and admit of the opening of such pocket-mouth to sufficient extent to admit of the pasted end of the wrapper passing into the bight of the apron without the paste on the wrapper contacting with and being rubbed off of the wrapper by said bight. This slight opening of the mouth of the contracted pocket of the apron does not allow any filler particles or filaments to escape to the wrapper-lap in rolling the latter by roller $h$, because the filler has been previously fully inclosed in the first fold of the wrapper while being drawn to its proper size in the apron-pocket. After the wrapping-roller $h$ reaches the position shown in Fig. 7 a further movement causes it to pass onto the table C with the filler of the proper size drawn against the wrapper. The plate F meanwhile has receded or started to make its return movement to admit of the wrapper-roller $h$ raising or moving up onto the table C the apron pocket or loop with contained proper size and partially-wrapped filler, whereupon wrapping-roller $h$ acts to roll the wrapper in the bight of the apron, as indicated in Fig. 8, the lever $d^3$ still continuing to take up slack from the front end of the apron, if necessary; but meanwhile the lever $d^4$ has come into action to take up slack from the rear end of the apron during such rolling, so as to prevent slipping of the cigarette and consequent impairment or breaking of the same while its wrapper is being rolled. When the wrapping-roller $h$ reaches the position shown in Fig. 9, the cigarette is delivered into the recessed knives $t$ and receptacle $t^2$, whereupon wrapping-roller $h$ begins to recede, and when about half-way over the table, as indicated by dotted lines $x'$, the plunger $m$ descends into opening $c$ to make a pocket in the apron and thus suddenly or quickly withdraw the rear end of the apron from contact with knives $t$ before the movable knives $t'$ get into position for cutting, said plunger being elevated before the wrapping-roller $h$ reaches said pocket in returning to its normal position. As soon as such position is reached the plunger $m$ again descends to form a pocket for the filler, which is in the next approaching receiver $b^3$. When, therefore, the plunger $m$ is used to take the rear end of the apron from the knives $t$, it is actuated twice during one complete to-and-fro movement of wrapping-roller $h$. As soon as the cigarette is delivered to receptacle $t^2$ the knives $t'$ descend, and in so moving the spring-plate or presser $t^5$ first impinges upon the cigarette to apply pressure thereto before the ends are cut, and thus maintain the cut edge intact, whereupon the knives $t'$ ascend and the receptacle $t^2$ is moved toward the apron S to admit of its arms $s$ passing through the slots $t^3$ in said receptacle to remove the cigarette when said apron is moved to do so. If the receptacle $t^2$ is stationary, the belt S is actuated to make such removal as soon as the knives $t'$ and plate $t^5$ ascend.

If desired, the rear wall or side of table-opening $c$ may be provided with a serrated surface of rubber or other material $c^5$ to hold the contiguous side of the apron pocket or loop from rising while the filler is being drawn to its proper size and inclosed in the front fold or end of the wrapper and also when the wrapping-roller $h$ is coming into action. The wrapper-carrier plate $q$ is preferably wedge shape in cross-section or inclines from its rear edge to a feather front edge, so that when brought to position across the apron with its feather edge adjoining the apron-pocket the plate when caused to do so readily removes itself from the wrapper, (see more plainly Fig. 5,) more especially so as the latter is held by the closed pocket or loop when the carrier withdraws itself from the wrapper.

From the description of the type of machine herein shown it will be noted that a perpendicularly-located pocket or loop is formed in the apron adjacent to a horizontal table. The especial advantages thereof are, first, facility of feeding the wrapper and its carrier to position across the apron and the overhanging part of the wrapper into the apron pocket or loop; second, facility of closing the apron-pocket and applying a holding pressure to the wrapper intermediate of its long edges by the plate F, it preventing the wrapper being moved from its position on the carrier-plate or relieves that part of the wrapper on the carrier-plate from pulling strains incident to the contraction of the apron pocket or loop for drawing the filler to its proper size and inclosing it in the first fold of the wrapper and in forming the initial part of its lap, said device F therefore serves as a pocket or loop closer and a presser-plate for the wrapper, and in moving to position it simultaneously closes the pocket-mouth and impinges one side of the apron against the wrapper to apply holding pressure to it and the other side of the apron, it also serving to prevent the apron pocket or loop rising during its contraction; third, drawing the filler to its proper size in a vertically-located pocket or loop, whereby the loose filaments or particles thereof fall back upon the filler instead of slipping or moving in advance of it, and hence they do not tend to escape from the filler as the first fold of the wrapper is about to close to form the initial part of its lap, and the prevention of any part of the filler between the wrapper-lap is more positively assured; fourth, the hand feeding of the fillers and the wrappers to their respective conveyer or carrier devices admits of the desirable and proper manipulation to place them in condition for obtaining the essential requirements for a free-smoking and salable all-tobacco cigarette; fifth, facility of drawing the front or one end only of the apron to contract the loop for bringing the filler to a size, and for continuing such drawing movement of said end of the apron to take up its slack during the rolling of the wrapper-lap and also for permitting the opposite end of the apron to make its draw to take up slack of the rear end of apron.

As the wrappers are not subject to the drawing strains incident to the compression of the fillers, wrappers of a tender nature can be used for making cigarettes in my machine, which wrappers cannot be used in making hand-made cigarettes, as they are too tender to stand the rolling stress incident to the manner customarily employed in making hand-made cigarettes.

I do not desire to confine myself to a rotary filler-receiver carrier of the particular kind shown, or, in fact, to a carrier that rotates, for evidently other forms of carriers might be substituted in place of this particular form; but I prefer the one shown, which is adapted for use both on cigarette-making and cigar bunching or making machines. So, too, the manner of forming the bight in the apron and the actuating mechanism for drawing each end of the apron, as described, may be used for bunching and making cigars.

Again, I do not desire to confine myself to particular forms of devices to which the ends of the apron or belt are respectively connected, nor to particular forms of actuating mechanism to first draw the front or one end of the apron or belt immediately after the pocket or loop is formed to compress the filler to a proper size and inclose it in one fold of the wrapper and afterward to draw the rear or other end of the apron or belt while the wrapper is being rolled to unite its lap or edges, for evidently other forms of apron or belt and holding devices and of actuating mechanism may be substituted in place of the particular forms illustrated; but I prefer those shown. By altering or changing the inclination or set of the levers $d^3$ $d^4$ on their respective shafts and relatively to one another the slack of the apron and the depth of its pocket may be suitably varied, as desired, to provide for making different sizes in cross-section of cigarettes or cigars.

I do not desire to confine myself to any particular form and arrangement of apron, for evidently other forms and arrangements of aprons may be used. I prefer, however, the form and arrangement shown on account of the greater ease and positiveness with which mechanism can be arranged for engaging each end of the apron.

I do not desire to confine myself to the particular forms of pocket or loop forming mechanism for the apron, for evidently other forms of the same may be used or the natural sag of the apron itself may be utilized to make such pocket, as is well known in the art. Nor do I confine myself to the use of a table for rolling the wrapper around the cigarette in the bight of the apron; but I prefer to use the table, as with it the cigarette-wrapper can be more smoothly rolled for imparting to it the desired commercial or salable appearance.

I do not confine myself to a device for closing the mouth of the apron pocket or loop, which chokes, impinges, or moves one side of said mouth against the other to close the pocket and hold the wrapper part inserted in the pocket, as it is evident that other forms of pocket or loop closing devices may be differently used for accomplishing the purposes of closing or filling up the mouth of the loop or pocket and holding the part of the wrapper inserted into the pocket and permit the front or one end of the apron to be drawn or moved to compress the filler to a size and inclose it in the fold of the wrapper while in the pocket or loop.

It is evident to any mechanic that the cutters may be adjusted laterally to provide for cutting different lengths of cigarettes.

I do not confine myself to making the pocket or loop mouth closing devices and the wrapping-roller separate from each other, for it is evident that they may be otherwise arranged for accomplishing the purposes described.

I do not confine myself to the particular forms of mechanism for closing the apron-pocket mouth to bind the wrapper therein and for rolling or wrapping the first fold of the wrapper around the filler in the apron-pocket before slightly opening the mouth of the pocket to admit of the pasted end of the wrapper passing into the bight of the apron when the wrapper is rolled to unite its edges without the paste on the wrapper contacting with the bight of the apron, as it is evident that other forms of mechanism for accomplishing the results described may be used; but I prefer the particular forms shown and described.

What I claim is—

1. In a cigarette-machine, the combination of an apron, mechanism for forming a loop or pocket in the apron, a loop or pocket closing device, a traveling bight-forming device, actuating mechanism engaging the front or one end of the apron, and actuating mechanism for engaging the rear or other end of the apron, adapted or timed to draw first upon the front or one end of the apron immediately after the pocket is formed and closed and afterward upon the opposite or rear end of the apron while the wrapper is being rolled to unite its edges, substantially as set forth.

2. In a cigarette-machine, the combination of an apron adapted to have a pocket or loop formed therein, a pocket or loop closing device, a bight-forming device, actuating mechanism engaging the front or one end of the apron, and actuating mechanism engaging the rear or other end of the apron, adapted or timed to draw first upon the front or one end of the apron immediately after the pocket or loop is closed and afterward upon the opposite end of the apron while the wrapper is being rolled, substantially as set forth.

3. In a cigarette-machine, the combination of an apron adapted to have a pocket or loop formed therein, a pocket or loop closing device, a bight-forming device, a wrapper or cigarette-rolling table, actuating mechanism engaging the front or one end of the apron, and actuating mechanism engaging the rear or other end of the apron, adapted or timed to draw first upon the front or one end of the apron immediately after the pocket or loop is closed and afterward upon the opposite end of the apron while the wrapper is being rolled in the bight of the apron on said table, substantially as set forth.

4. In a cigarette-machine, the combination of an apron adapted to have a pocket or loop formed therein, loop or pocket closing device, bight-forming and wrapper-rolling devices, actuating mechanism engaging the front or one end of the apron, and actuating mechanism engaging the rear or other end of the apron, adapted or timed to draw first upon the front or one end of the apron immediately after the pocket is closed and afterward upon the opposite end of the apron while the wrapper is being rolled in the bight of the apron, substantially as set forth.

5. In a cigarette-machine, the combination of an apron adapted to have a pocket or loop formed in it and connected at each end to independently-movable devices, pocket-closing, bight-forming, and wrapper-rolling devices, and independent mechanism connected to each of said movable devices that carry each end of the apron, adapted to draw first upon the front end of the apron immediately after the pocket is formed and closed and afterward upon the opposite end of the apron while the wrapper is being rolled in the bight of the apron, substantially as set forth.

6. In a cigarette-machine, the combination of an apron adapted to have a pocket or loop formed in it, a loop or pocket closing device, a wrapper-roller, independently-movable devices engaging each end of the apron, independent mechanism for each of said movable devices engaging the apron, adapted to draw first upon the front or one end of the apron immediately after the pocket or loop is closed and afterward upon the opposite end of the apron while the wrapper is being rolled around the filler to unite its edges, substantially as set forth.

7. In a cigarette-machine, the combination of an apron having a pocket or loop, a device for preventing the filler escaping from the pocket or loop, independently-actuating mechanism engaging each end of the apron, and a traveling wrapper-rolling device, substantially as set forth.

8. In a cigarette-machine, the combination of an apron, a pocket or loop forming device for said apron, a device for preventing the filler escaping from the pocket or loop, independent actuating mechanism engaging each end of the apron, and a wrapper-rolling device, substantially as set forth.

9. In a cigarette-machine, the combination of an apron adapted to have a pocket or loop formed in it, a device for closing the pocket or loop, a moving wrapper-rolling device independent of the pocket or loop closing device, and actuating mechanism for drawing on that end of the apron which points away from the direction of movement of the moving wrapper-rolling device, substantially as set forth.

10. In a cigarette-machine, the combination of an apron, a pocket or loop forming device for the apron, a device for closing the pocket or loop, a moving wrapper-rolling device independent of the pocket-closing device, a rolling-table, and actuating mechanism for drawing on that end of the apron which points away from the direction of movement of the moving wrapper-rolling device, substantially as set forth.

11. In a cigarette-machine, the combination of an apron, a rolling-table, mechanism for forming a pocket in the apron, independent mechanism for closing the mouth of the pocket, and an independent and movable wrapper-rolling device, substantially as set forth.

12. In a cigarette-machine, the combination of an apron adapted to have a pocket or loop in it, independent mechanism for closing the mouth of the pocket, and an independent and movable wrapper-rolling device, substantially as set forth.

13. In a cigarette-machine, the combination of an apron, mechanism for forming a pocket in said apron, a pocket-closing device, actuating mechanism engaging the apron and for drawing on said apron when the filler is in said pocket to compress the filler to its proper size in the pocket and partially roll the wrapper around the filler, and a wrapper-rolling device for uniting the wrapper edges or lap, substantially as set forth.

14. In a cigarette-machine, the combination of an apron adapted to have a pocket formed in it, a pocket-closing device, actuating mechanism engaging the apron and for drawing on said apron when the filler is in said pocket to compress the filler to its proper size in the pocket and partially roll the wrapper around the filler, and a wrapper-rolling device for uniting the wrapper edges or lap, substantially as set forth.

15. In a cigarette-machine, the combination of a series of horizontally moving or traveling filler-receivers, each having an open top and a normally-closed bottom, independent actuating mechanism for moving each successive receiver into a discharging position, and actuating mechanism for opening the closed bottom of each receiver when in discharging position, substantially as set forth.

16. In a cigarette-machine, the combination of a moving carrier, a number of filler-receivers mounted upon and moving with said carrier, each of said receivers having an open top and normally-closed bottom, actuating mechanism for moving each successive receiver into a discharging position, and independent actuating mechanism for opening the closed bottom of each receiver when in discharging position, substantially as set forth.

17. In a cigarette-machine, the combination of a traveling carrier, separate filler-receivers on said carrier, and each receiver having an open top and normally-closed bottom, and independent actuating devices operating to first move each successive receiver into discharging position, and, secondly, to move it therefrom into the path of return movement, substantially as set forth.

18. In a cigarette-machine, the combination of a traveling carrier, filler-receivers secured to movable arms mounted on said carrier, and each receiver having an open top and a movable and normally-closed bottom, actuating mechanism for said arms, whereby the receivers are placed into discharging position, and actuating devices partly located on the receiver and partly in gear with the driving mechanism of the machine for engaging the movable part of the receivers to open the latter, substantially as set forth.

19. In a cigarette-machine, the combination of a rotating carrier having loosely-mounted arms $b^2$, a stationary support $a^2$ therefor, having open slot $a^4$ for said arms, receivers on the outer ends of said arms, a normally-closed movable discharging side for said receivers, actuating devices for said carrier, and mechanism for lowering the receivers on said arms to a discharging position and raising the same to their normal position, substantially as set forth.

20. In a cigarette-machine, the combination of a traveling carrier having movable arms, receivers on the outer ends of said arms, a support $a^2$, having open slot $a^4$ for said arms, actuating mechanism independently of the carrier for lowering the receivers and said arms by way of slot $a^4$ to a discharging position and for raising them to their path of return movement, substantially as set forth.

21. In a cigarette-machine, the combination of a horizontally-moving carrier having independently-movable arms, filler-receivers secured to the movable arms and having a movement to a discharging position and return independently of the carrier, and actuating mechanism for moving the receivers to the discharging position and returning them, substantially as set forth.

22. In a cigarette-machine, the combination of means for rolling the cigarette, a traveling carrier, independently-movable arms on said carrier, receivers mounted on said movable arms, and devices for positioning each receiver alternately over the means for rolling the cigarettes, substantially as set forth.

23. In a cigarette-machine, the combination of a means for rolling a cigarette, an intermittently-rotating carrier having radiating arms, to the outer ends of which are attached filler-receivers, each having an open top and a movable bottom, devices for alternately positioning the filler-receivers over the latter mechanism, and actuating mechanism for discharging the filler-receivers, substantially as set forth.

24. In a cigarette-machine, the combination of an apron adapted to have a pocket or loop formed in it, devices for closing the mouth of said pocket or loop, an intermittently-rotating carrier having several independently-movable arms provided with filler-receivers, each having an open top and movable side or bottom, which receivers alternately move into a discharging position in the apron pocket or loop, and mechanism for opening said receivers in said pocket to effect their discharge and for raising them to a normal return position, substantially as set forth.

25. In a cigarette-machine having a cigarette-rolling apron, the combination of a turning wrapper-carrying plate normally located parallel with and approximating to the plane of the rolling-apron, actuating mechanism for first turning said plate to position across the apron, actuating mechanism for lowering it toward or upon said apron and dwelling or resting it near or upon the apron, and actuating mechanism for raising and turning it to make its return movement, the wrapper being by it delivered upon the apron on the initial motion of the return movement of the carrier, substantially as set forth.

26. In a cigarette-machine having a receptacle for the filler, the combination of a movable wrapper-carrier and actuating devices for moving the carrier to present the wrapper to the receptacle with a part of the wrapper delivered into the receptacle, a filler-receiver and actuating mechanism for positioning it and discharging the filler into said receptacle, and devices for closing said receptacle and at the same time engage or hold the part of said wrapper delivered into said receptacle, substantially as set forth.

27. In a cigarette-machine, the combination of an apron adapted to have a pocket or loop formed therein, a device for closing the mouth of the pocket or loop of the apron, and means for limiting the movement of the pocket-closing device and for holding it in position against tendency to rise or move, whereby undue pressure on the apron is prevented, and said closing device serves as a holding or engaging device for the wrapper in said pocket, substantially as set forth.

28. In a cigarette-machine, the combination of an apron, pocket-forming device for the apron, a device for closing the mouth of the pocket, and means for limiting the movement and locking the pocket-closing device in position against tendency to rise or move when in its locked position, whereby undue pressure on the apron is prevented and the wrapper in the pocket is held or engaged by said closing device, substantially as set forth.

29. In a cigarette-machine, the combination of an apron adapted to have a pocket formed therein, a movable wrapper-carrier having actuating devices for presenting the wrapper to the apron-pocket and sustaining the wrapper over the pocket, and a movable pasting device having actuating mechanism for first moving it to and above the wrapper-carrier, then lowering it thereon to apply the adhesive material to the wrapper on the carrier, and giving it a wiping motion as it applies the adhesive material to the wrapper, substantially as set forth.

30. In a cigarette-machine having a receptacle for the filler, the combination of a movable wrapper-carrier having actuating devices for presenting the wrapper to said receptacle and sustaining the wrapper over the receptacle, and a movable device having actuating mechanism for first moving it to and above the wrapper-carrier, then lowering it thereon to apply the adhesive material to the wrapper on the carrier, and giving to it a wiping motion as it applies the adhesive material to the wrapper, substantially as set forth.

31. In a cigarette-machine, the combination of a paster device, an intermittently-rotating supply-receptacle for the paster, a fixed main supply-reservoir in said receptacle, and actuating mechanism for depressing and then raising said paster into and from said receptacle and for moving the paster into pasting position, substantially as set forth.

32. In a cigarette-machine, the combination of a rolling-table, an apron adapted to have a pocket or loop formed in it, means for closing the mouth of the pocket in the apron and also acting to impinge one edge of the loop-mouth against the wrapper intermediate of its long edges, means for actuating one end of the apron to contract its loop or pocket when its mouth is closed and draw the filler to a proper size in the pocket and wind the first fold of the wrapper around the filler, and suitable means for fully completing the rolling of the wrapper in the apron on the table, substantially as set forth.

33. In a cigarette-machine, the combination of a rolling-surface for the cigarette, an apron adapted to have a pocket or loop formed therein, means for closing the mouth of said pocket and impinging or holding the wrapper between its edges in said pocket, means for actuating one end of said apron to contract its loop or pocket when its mouth is closed and draw the filler to a proper size in the pocket and wind the first fold of the wrapper around the filler in said pocket, and suitable means for completing the rolling of the wrapper upon said rolling-surface, substantially as set forth.

34. The combination of an apron having a pocket therein, a wrapper-carrier-actuating mechanism for moving the wrapper-carrier to presenting position over the apron, a pasting device adapted for moving to position over the carrier when in presenting position, and actuating mechanism for first moving the pasting device, then lowering it onto the wrapper-carrier, and then, while upon the wrapper on said carrier, imparting to it a wiping motion, substantially as set forth.

35. In a cigarette-machine, the combination of two sets of cutters, one movable from the other, a pressure-plate between said movable cutters, and a receiver between the remaining cutters and opposite to said pressure-plate, substantially as set forth.

36. In a cigarette-machine, the combination of fixed cutters, movable cutters over or in line with said fixed cutters, a pressure-plate between said movable cutters, a receiver in line with said pressure-plate and between the fixed cutters, and a delivery apparatus for carrying away the trimmed cigarettes, substantially as set forth.

37. In a cigarette-machine, the combination of two sets of cutters, one movable from the other, a pressure-plate between said movable cutters, a receiver between the remaining cutters and opposite to said pressure-plate, and a delivery apparatus for carrying away the trimmed cigarettes, substantially as set forth.

38. In a cigarette-machine, the combination, substantially as described, of an apron adapted to have a pocket or loop formed in it, a device for closing the mouth of the pocket or loop and at the same time binding or holding a wrapper in said pocket, means for preventing said closing device imparting undue closing pressure on the mouth of the pocket and wrapper while the filler in said pocket is being inclosed in the fold or part of the wrapper within the pocket, and means for rolling the apron to unite the edges of the wrapper around the filler.

In testimony whereof I affix my signature in presence of two witnesses.

HENRY BAUER.

Witnesses:
CHAS. F. VAN HORN,
M. W. WALKER.